(12) United States Patent
Watanabe et al.

(10) Patent No.: US 9,739,948 B2
(45) Date of Patent: Aug. 22, 2017

(54) LENS-EQUIPPED CONNECTOR

(71) Applicant: SUMITOMO ELECTRIC INDUSTRIES, LTD., Osaka-shi, Osaka (JP)

(72) Inventors: Takuro Watanabe, Yokohama (JP); Masaki Ohmura, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/980,094

(22) Filed: Dec. 28, 2015

(65) Prior Publication Data

US 2017/0184793 A1    Jun. 29, 2017

(51) Int. Cl.
G02B 6/32 (2006.01)
G02B 6/38 (2006.01)

(52) U.S. Cl.
CPC .............. *G02B 6/32* (2013.01); *G02B 6/382* (2013.01); *G02B 6/3885* (2013.01)

(58) Field of Classification Search
None
See application file for complete search history.

(56) References Cited

U.S. PATENT DOCUMENTS

| | | | |
|---|---|---|---|
| 4,718,744 A | | 1/1988 | Manning |
| 5,241,612 A | * | 8/1993 | Iwama ..................... G02B 6/32 385/59 |
| 6,012,852 A | * | 1/2000 | Kadar-Kallen .......... G02B 6/32 385/74 |
| 9,405,076 B2 | * | 8/2016 | Chen ..................... G02B 6/3885 |
| 2002/0186932 A1 | * | 12/2002 | Barnes ................. G02B 6/3846 385/78 |
| 2011/0229077 A1 | | 9/2011 | Fortusini et al. |
| 2012/0177327 A1 | | 7/2012 | DeMeritt et al. |

FOREIGN PATENT DOCUMENTS

| | | |
|---|---|---|
| JP | 2008-151843 A | 7/2008 |
| JP | 2008-535037 A | 8/2008 |
| WO | WO-2012/174221 A2 | 12/2012 |
| WO | WO-2012/174223 A2 | 12/2012 |
| WO | WO-2012/174227 A2 | 12/2012 |
| WO | WO-2013/019622 A2 | 2/2013 |

* cited by examiner

*Primary Examiner* — Uyen Chau N Le
*Assistant Examiner* — Chad Smith
(74) *Attorney, Agent, or Firm* — Drinker Biddle & Reath LLP

(57) ABSTRACT

The ferrule has a rear end and a front end, an opening that is formed in the rear end and communicates with fiber holding holes holding the optical fibers formed from the rear end toward the front end, and first connection parts which are formed at the front end and to which the lens array is connected. The lens array has a rear face and a surface including an outgoing plane, lenses receiving the light from the optical fibers, and second connection parts connected to the first connection parts, the lenses and the second connection parts being formed on the rear face, and a flat face from which the light from the optical fibers is emitted, and third connection parts connected to an opposite connector, the flat face and the second connection parts being formed on the surface.

10 Claims, 11 Drawing Sheets

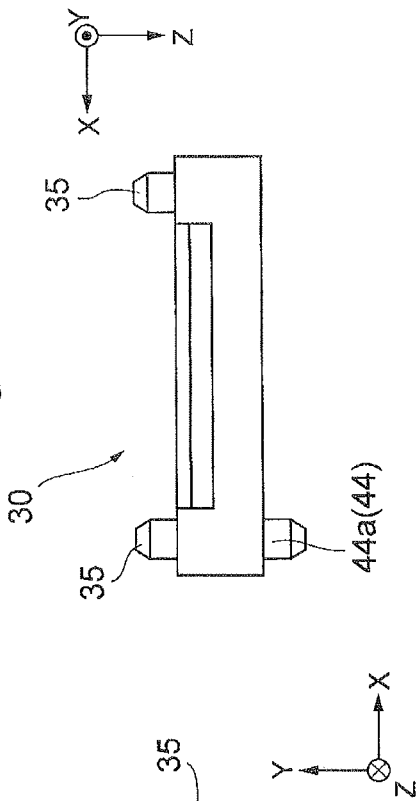
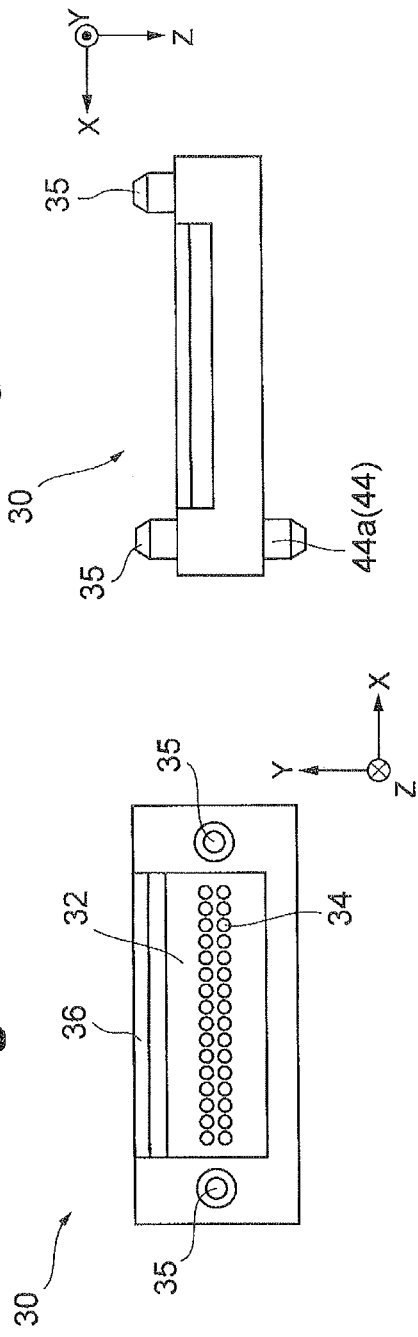
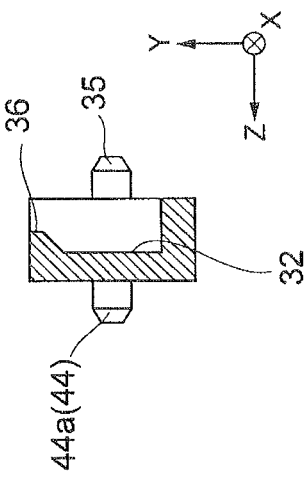
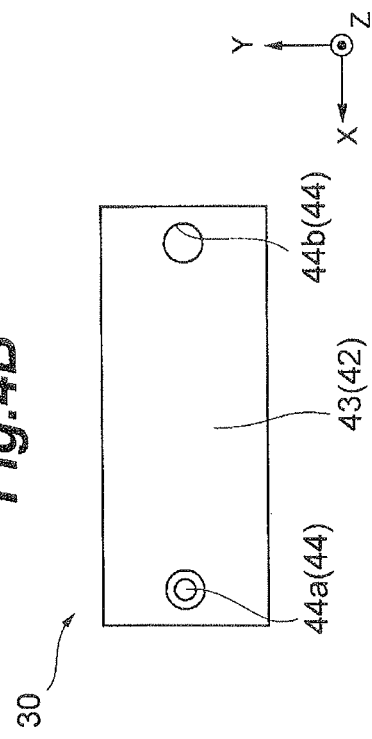

ered connector of FIG. 7.
LENS-EQUIPPED CONNECTOR

BACKGROUND OF THE INVENTION

1. Field of the Invention

The present invention relates to a lens-equipped connector.

2. Background Arts

A technique for colliding lens-equipped connectors to which optical fibers are fixed to perform optical connection between the optical fibers is disclosed in Japanese Unexamined Patent Publication No. 2008-151843.

In conventional lens-equipped connectors, lenses are formed on an end face (outer surface) of a ferrule. In this configuration, the end face of the ferrule is not a flat surface due to the lenses. For this reason, there is a problem that, when the end face of the ferrule that easily gets dirty is cleaned, dirt of the surface is not wiped off well but remains.

SUMMARY OF THE INVENTION

A lens-equipped connector according to an aspect of the present invention includes, as an aspect thereof, a ferrule holding optical fibers and a lens array fixed to the ferrule. The ferrule has a rear end and a front end, an opening that is formed in the rear end and communicates with fiber holding holes that are formed from the rear end toward the front end and hold the optical fibers, and first connection parts which are formed at the front end and to which the lens array is connected. The lens array has a rear face including an incident plane that receives light from the optical fibers, and a surface including an outgoing plane from which the light from the optical fibers is emitted, lenses receiving the light from the optical fibers, and second connection parts connected to the first connection parts, the lenses and the second connection parts being formed on the rear face, and a flat face from which the light from the optical fibers is emitted, and third connection parts connected to an opposite connector, the flat face and the second connection parts being formed on the surface.

BRIEF DESCRIPTION OF THE DRAWINGS

FIG. 4A is a front view of the lens array, FIG. 4B is a rear view of the lens array, FIG. 4C is a top view of the lens array, and FIG. 4D is a side sectional view of the lens array.

DESCRIPTION OF EMBODIMENTS

Figure 1:
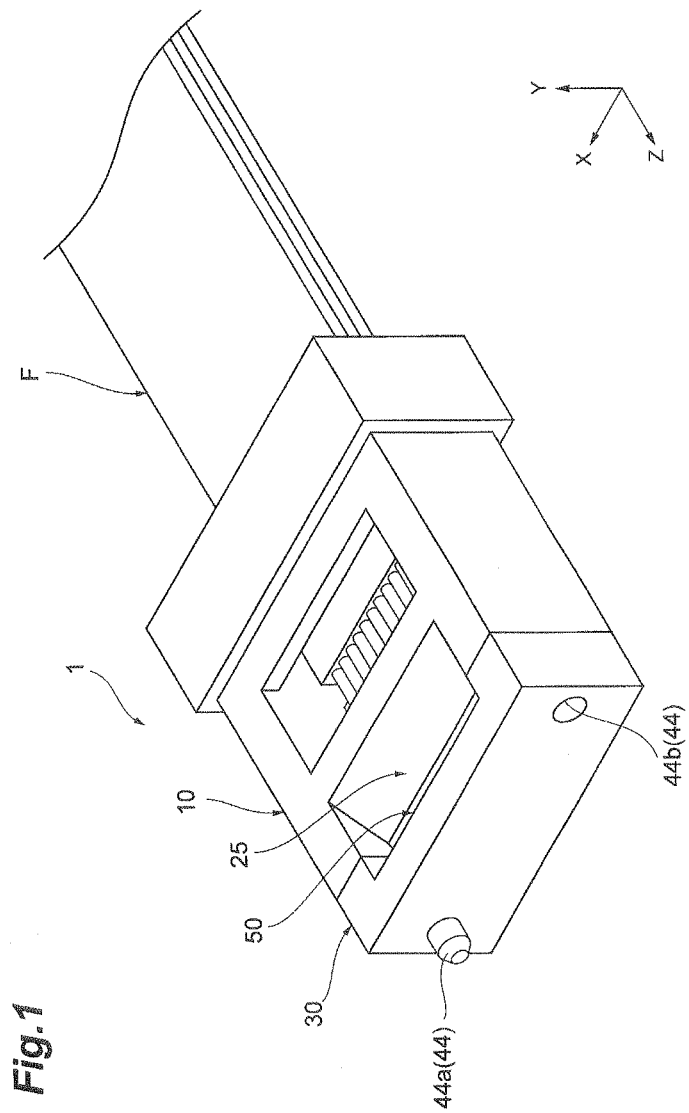
FIG. 1 is a perspective view illustrating a lens-equipped connector according to a first embodiment of the present invention.

First, contents of embodiments of the present invention will be listed and described.

A lens-equipped connector according to an aspect of the present invention includes, as an aspect thereof, a ferrule holding optical fibers and a lens array fixed to the ferrule. The ferrule has a rear end and a front end, an opening that is formed in the rear end and communicates with fiber holding holes that are formed from the rear end toward the front end and hold the optical fibers, and first connection parts which are formed at the front end and to which the lens array is connected. The lens array has a rear face including an incident plane that receives light from the optical fibers, and a surface including an outgoing plane from which the light from the optical fibers is emitted, lenses receiving the light from the optical fibers, and second connection parts connected to the first connection parts, the lenses and the second connection parts being formed on the rear face, and a flat face from which the light from the optical fibers is emitted, and third connection parts connected to an opposite connector, the flat face and the second connection parts being formed on the surface.

According to this configuration, the lenses are disposed on the rear face (face facing the ferrule at the lens array) of the lens array connected to the ferrule. Thereby, the surface (surface exposed to an end face of the lens-equipped connector) of the lens array can be configured with no lenses disposed thereon, and can be used as a flat face. The end face of the lens-equipped connector can be easily cleaned. Since the first connection parts of the front end of the ferrule and the second connection parts of the rear face of the lens array can be connected, the lens-equipped connector can be easily formed. Further, since the surface of the lens array is provided with the third connection parts connected to the opposite connector, the connection with the counterpart connector can also be easily performed. Therefore, according to the aspect of the present invention, it is possible to easily provide the lens-equipped connector having the rear face lenses configured such that the end face can be easily cleaned.

The rear face and the front end may have abutting faces that come in contact with each other to determine a separation distance between the lenses and the front end, and an open part may be formed between the rear face and the front end to introduce an adhesive fixing the ferrule and the lens array between the rear face and the front end. The rear face of the lens array and the front end of the ferrule come in contact with each other, and thereby the separation distance between the lenses provided for the rear face and the front end is determined as a fixed distance. In the state in which the rear face and the front end come in contact with each other, the open part is formed between the rear face and the front end. The adhesive is introduced into the open part, and thereby the ferrule and the lens array can be easily fixed while maintaining the separation distance.

The abutting faces may be formed to surround three of surrounding four directions in which the lenses are surrounded. Since the abutting faces are formed to surround the lenses, the adhesive introduced from the open part is suitably contained, and can be prevented from leaking out.

The abutting face of the front end may include a first lower end face that protrudes toward the rear face or is recessed toward the rear end relative to a face in which the fiber holding holes are formed at the front end, and the abutting face of the rear face may include a second lower end face that protrudes toward the front end or is recessed toward the surface relative to a face for which the lenses are provided. The first lower end face may be recessed toward the rear end when the second lower end face protrudes toward the front end, and may protrude toward the rear face when the second lower end face is recessed toward the surface, and the first lower end face and the second lower end face may come in contact with each other. One of the first and second lower end faces is the protruding surface, and the other of the first and second lower end faces is the recessed surface. Since the first and second lower end faces come in contact with each other and the lower end abutting face is formed, it is possible to more effectively prevent the adhesive introduced from the open part from leaking out, compared to, for example, a case in which faces having no unevenness come in contact with each other and an abutting face is formed.

The second lower end face, which protrudes toward the front end relative to the face for which the lenses are provided, and the first lower end face, which is formed to be recessed toward the rear end relative to the face in which the fiber holding holes are formed at the front end and to house the second lower end face, may come in contact with each other. Thereby, the second lower end face may be configured not to protrude further than the fiber holding face (not to protrude toward the rear face) at the front end of the ferrule. After the optical fibers are set for the ferrule (i.e., after the optical fibers pass through the fiber holding holes), when the optical fibers are polished, the second tower end face does not obstruct the polishing. Accordingly, it is possible to improve workability.

The lens array may further have a rib that is formed on the rear face and protrudes from an upper end of the incident plane toward the open part. Since mechanical strength of the lens array is increased by having the rib, the lens array can be configured to endure stress caused by the volumetric change of the adhesive when the adhesive introduced into the open part is hardened, and the lens array can be prevented from being deformed.

The third connection parts may be formed at a pair of positions between which a region in which the light is incident and emitted with respect to the lens array is sandwiched. One of the third connection parts may be a pin protruding from the surface, and the other of the third connection parts may be a hole recessed toward the rear face. The third connection parts are formed by the pin and the hole, and thereby the connectors can be easily connected. For example, a position at which the pin is provided and a position at which the hole is provided are made in common between the connectors. Thereby, up and bottom directions of the connectors connected to each other are aligned and opposed, the pin and the hole are opposed to each other. It is possible to prevent the connector from being reversely connected upside down.

The first connection parts may be holes formed at a pair of positions between which the fiber holding holes are sandwiched at the front end, and the second connection parts may be pins formed at a pair of positions between which the lenses are sandwiched. The pins (second connection parts) and the holes (first connection parts) are fitted, and thereby the ferrule and the lens array are connected. It is possible to facilitate a connecting task. As the ferrule and the lens array are connected by the pair of first connection parts between which the fiber holding holes are sandwiched and the pair of second connection parts between which the lenses are sandwiched, positions of the fiber holding holes and the lenses can be stably fixed, and the optical axes can be inhibited from deviating.

The first and second connection parts may be formed with ratchets that are able to be mutually fitted and temporarily fixed. As the ratchets are formed, after the first and second connection parts are temporarily fixed, a task of fixing the ferrule and the lens array using the adhesive can be easily performed.

The ferrule and the lens array may be formed of materials whose linear expansion coefficients are identical to each other. It is difficult for the positions of the fiber holding holes and the positions of the lenses to be shifted by a change in temperature, and the optical characteristics can also be hardly changed by the temperature change.

The ferrule and the lens array may be fixed by an adhesive, the adhesive may cover the lenses. A refractive index of the adhesive may be greater than that of air and be less than that of the material of which the lens array is formed. Thereby, it is possible to reduce a difference in refractive index between the lenses and the end of the fiber, to reduce a loss caused by the beam that is subjected to Fresnel reflection by the lenses, and to improve the optical characteristics of the connector.

Hereinafter, an aspect of the lens-equipped connector of the present invention will be described in detail with reference to the attached drawings. In the description of the drawings, the same symbols are given to the same elements, and duplicate description thereof will be omitted.

First Embodiment

FIG. 1 is a perspective view illustrating a lens-equipped connector 1 according to a first embodiment of the present invention. The lens-equipped connector 1 is a connector that holds (fixes) multi-core optical fibers F, and collides with an end of another lens-equipped connector that also holds such optical fibers at an end thereof to perform optical connection between the optical fibers. The lens-equipped connector 1 is equipped with a ferrule 10 holding the optical fibers F, and a lens array 30 fixed to one end of the ferrule 10. The ferrule 10 and the lens array 30 may be formed of materials having equivalent linear expansion coefficients, for example, the same materials. As the materials of the ferrule 10 and the lens array 30, polyetherimide (PEI) or ULTEM that is a transparent resin may be used. In the following description, a width direction of the lens-equipped connector 1 is defined as an X direction, a height direction as a Y direction, and a direction (an inserting direction of the optical fibers F) intersecting the X and Y directions as a Z direction.

Figure 2:
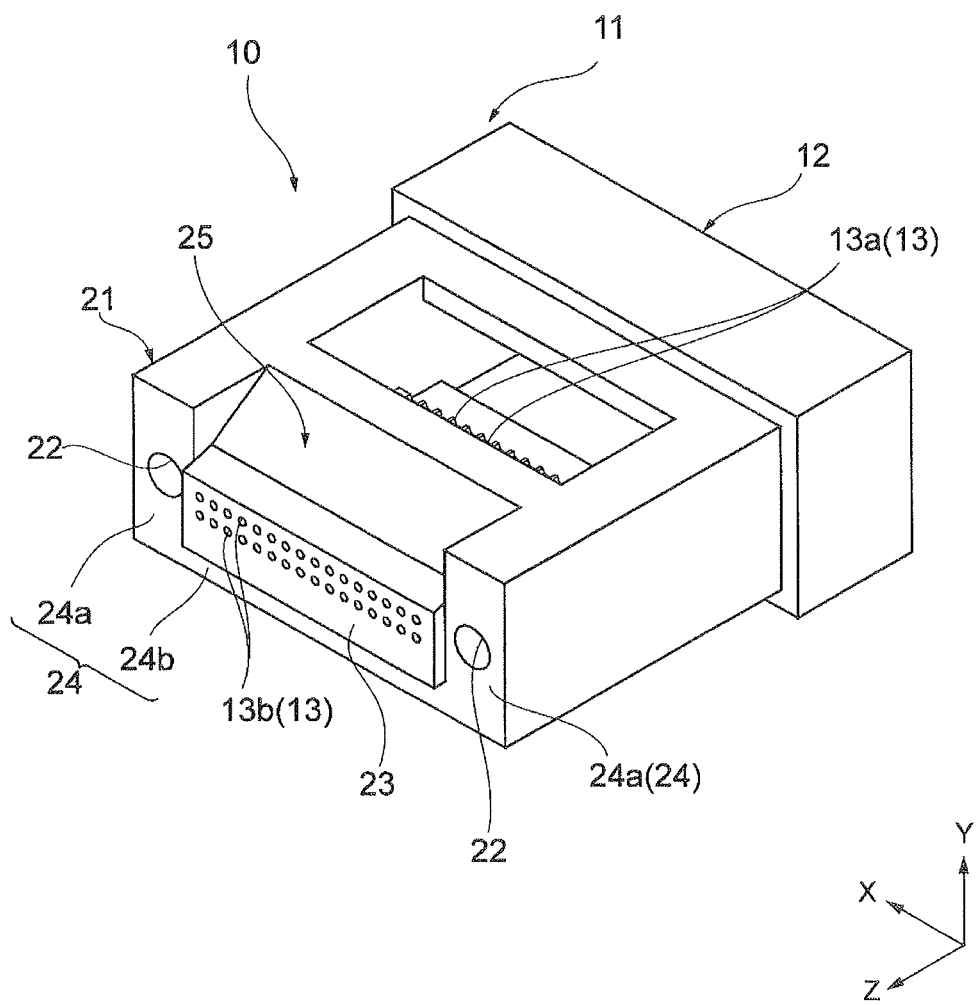
FIG. 2 is a perspective view illustrating a ferrule of the lens-equipped connector of FIG. 1.

Details of the ferrule 10 will be described with reference to FIG. 2. FIG. 2 is a perspective view illustrating the ferrule 10 of the lens-equipped connector 1 of FIG. 1. The ferrule 10 has a rear end 11 and a front end 21. The rear end 11 is formed with an opening 12 into which the optical fibers F are inserted. The opening 12 communicates with fiber holding holes 13. The fiber holding holes 13 are provided to hold the respective cores of the optical fibers F, communicate with the opening 12, and are formed to pass from the rear end 11 to the front end 21. The fiber holding holes 13 are formed in multiple stages (e.g. two stages) in the Y direction. In each stage, a plurality of fiber holding holes 13 are arranged side by side in the X direction. Each of the fiber holding holes 13 is made up of a large diameter part 13a that is formed toward the opening 12, and a small diameter part 13b that continues to the large diameter part 13a and is formed toward the front end 21 (see FIG. 6). The large diameter parts 13a hold the optical fibers F that are in a clad state, and the small diameter parts 13b hold bare fibers after claddings of the optical fibers F are removed.

The front end 21 has a fiber holding face 23 in which the fiber holding holes 13 are formed, and an abutting face 24 that comes in contact with the lens array 30. The abutting face 24 is provided to surround three directions excluding a top direction (upward in the Y direction) among four (left, right, top, and bottom) directions of the fiber holding face 23. That is, in the state in which the abutting face 24 comes in contact with the lens array 30, the abutting face 24 is provided to surround three directions excluding a top direction (upward in the Y direction) among four (left, right, top, and bottom) directions of lenses 34. The abutting face 24 is formed to be recessed toward the rear end 11 relative to the fiber holding face 23. The abutting face 24 is made up of first connection faces 24a provided in left and right directions (opposite sides in the X direction) of the fiber holding face 23, and a first lower end face 24b provided in a bottom direction (downward in the Y direction) of the fiber holding face 23. The first connection faces 24a and the first lower end face 24b are continuously formed to be flush with each other.

The first connection faces 24a are formed with first connection parts 22 to which the lens array 30 is connected. The first connection parts 22 are holes into which second connection parts 35 (see FIG. 3) that are guide pins of the lens array 30 to be described below are inserted. The first connection parts 22 are formed at the respective first connection faces 24a at the opposite sides in the X direction. That is, the first connection parts 22 are adapted to interpose the fiber holding holes 13 arranged side by side in the X direction, and are formed at the front end 21 at the opposite sides in the X direction.

As described above, the abutting face 24 is not provided in the top direction (upward in the Y direction) of the fiber holding face 23. For this reason, an open part 25 is formed in the top direction of the fiber holding face 23. In a state in which the ferrule 10 and the lens array 30 come in contact with each other, such an open part 25 is spatially connected from the top direction of the fiber holding face 23 to a space between the front end 21 and the rear face 31 (rear face of the lens array 30) (see FIG. 3). As an adhesive 50 (see FIG. 1) is introduced from the open part 25, the optical fibers F inserted into the fiber holding holes 13 are fixed to the fiber holding holes 13, and the ferrule 10 and the lens array 30 are fixed. A refractive index of the adhesive 50 (see FIG. 1) is made greater than that of air and less than that of the material of which the lens array 30 is formed.

Figure 3:
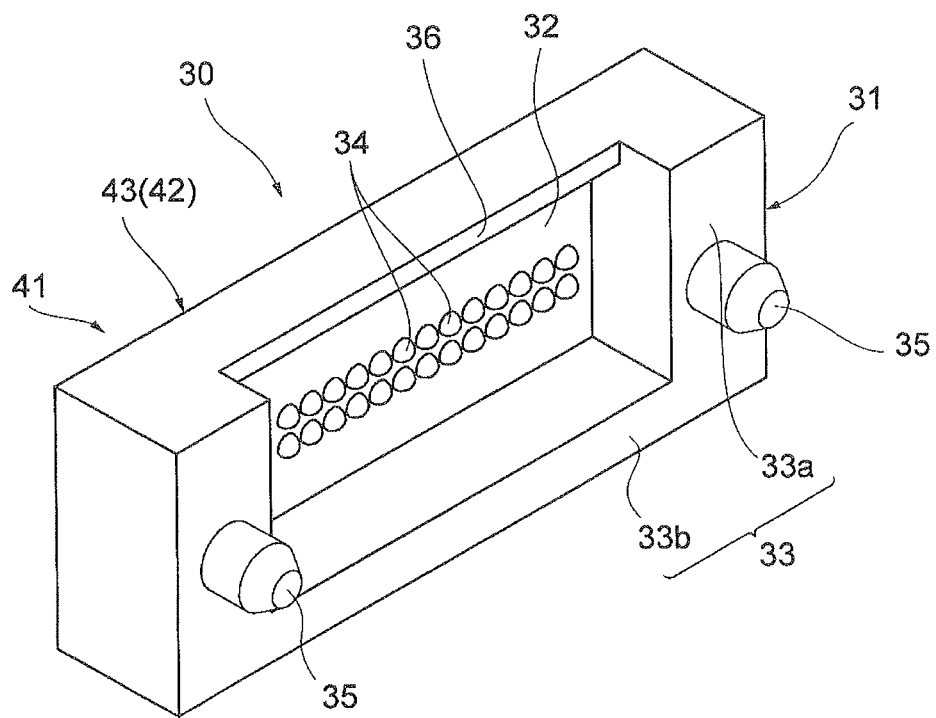
FIG. 3 is a perspective view illustrating a lens array of the lens-equipped connector of FIG. 1.

Next, details of the lens array 30 will be described with reference to FIGS. 3 and 4A-4C. FIG. 3 is a perspective view illustrating the lens array 30 of the lens-equipped connector of FIG. 1. FIG. 4A is a front view of the lens array 30, FIG. 4B is a rear view of the lens array 30, FIG. 4C is a top view of the lens array 30, and FIG. 4D is a side sectional view of the lens array 30. The lens array 30 has the rear face 31 including an incident plane 32, and a surface 41 including an outgoing plane 42.

The rear face 31 has an incident plane 32 that receives light from the optical fibers F held in the fiber holding holes 13 of the ferrule 10, and an abutting face 33 that comes in contact with the ferrule 10. The incident plane 32 is provided with the lenses 34 receiving the light from the optical fibers F. The lenses 34 are provided to be equal in number to the fiber holding holes 13, and are located at positions that substantially match optical axes of the optical fibers F which are held in the respective fiber holding holes 13. That is, tips of the optical fibers F are disposed at focal positions of the lenses 34. Thereby, beams emitted from the optical fibers F are incident onto the incident plane 32 of the lens array 30, and are collimated by the lenses 34. Then, the collimated beams are propagated into the lens array 30, and are emitted from the outgoing plane 42. When the lens-equipped connector 1 is connected to a counterpart (opposite) lens-equipped connector, the collimated beams are incident on an outgoing plane of the counterpart lens-equipped connector, are propagated into a lens array, and reach lenses of an incident plane. Then, the beams collimated by the lenses are collected and coupled at tips of optical fibers. In this way, with the use of the lens-equipped connector 1 of the present embodiment, according to a mode of the collimated beams whose diameters are enlarged, the beams are transmitted/received between the connectors. For this reason, optical characteristics are hardly deteriorated, for instance, by dust deposited on the end face of the connector. Even when positioning accuracy between the ferrule 10 and the lens array 30 is low, the optical characteristics are hardly deteriorated (or a tolerance is wide).

The abutting face 33 is provided to protrude toward the front end 21 (toward the open part 25) of the ferrule 10 relative to the incident plane 32, and is made up of second connection faces 33a that are provided in left and right directions (opposite sides in the X direction) of the incident plane 32 and a second lower end face 33b that is provided in a bottom direction (downward in the Y direction) of the incident plane 32. The second connection faces 33a and the second lower end face 33b are continuously formed to be flush with each other. An upper end of the incident plane 32 is provided with a rib 36 that protrudes toward the front end 21 (toward the open part 25) of the ferrule 10 relative to the incident plane 32. A length at which the rib 36 protrudes from the incident plane 32 toward the front end 21 is shorter than that at which the abutting face 33 protrudes. The rib 36 is provided to be connected to parts of protrusion sections forming the second connection faces 33a at the upper end of the incident plane 32 at the opposite sides in the X direction. Thereby, even when the adhesive 50 introduced from the open part 25 is hardened to cause a change in volume, the incident and outgoing planes 32 and 42 of the lens array 30 are firmly supported left and right via the rib 36, and thus the incident plane 32 and the outgoing plane 42 are hardly warped.

The second connection faces 33a are provided with second connection parts 35 connected to the first connection parts 22 of the ferrule 10. The second connection parts 35 are tapered guide pins inserted into the first connection parts 22 having hole shapes, and are provided for the respective second connection faces 33a at the opposite sides in the X direction. In a state in which the second connection parts 35 are combined with the ferrule 10, the second connection parts 35 protrude from the second connection faces 33a toward the front end 21 of the ferrule 10. Since the second connection parts 35 are tapered, the second connection parts 35 can be easily inserted into the first connection parts 22. The first connection parts 22 and the second connection parts 35 are disposed near the center of the front end 21 and the center of the rear face 31 in the Y direction, respectively. As a result, the ferrule 10 and the lens array 30 are stably supported via the first connection parts 22 and the second connection parts 35. In the ferrule 10 and the lens array 30, the second connection parts 35 are inserted into the first connection parts 22, and the abutting faces 24 and 33 come in contact with each other. Thereby, a separation distance between the lenses 34 and the front end 21 of the ferrule 10 is fixed. In the state in which the abutting faces 24 and 33 come in contact with each other, the aforementioned open part 25 is spatially connected to a gap formed between the lens array 30 and the ferrule 10, and thus the adhesive 50 introduced from the open part 25 is filled up to such a gap.

The surface 41 has the outgoing plane 42 from which the light from the optical fibers F is emitted, and third connection parts 44 that are connected to the opposite lens-equipped connector. The outgoing plane 42 includes a flat face 43 that is a flat surface from which the light from the optical fibers F is emitted. The third connection parts 44 are formed at the opposite sides in the X direction between which a region (i.e., the flat face 43) in which the light is incident on and emitted from the lens array 30 is sandwiched. The third connection parts 44 are disposed near the center of the surface 41 in the Y direction. One 44a of the third connection parts 44 is a tapered guide pin protruding from the surface 41, and the other 44b of the third connection parts 44 is a hole recessed toward the rear face 31. A positional relation of the third connection part 44a that is the guide pin and a positional relation of the third connection part 44b that is the hole into which the guide pin is inserted are made in common by each of the lens-equipped connectors 1, and thereby the opposite lens-equipped connector 1 can be connected without being turned upside down. Accordingly, all connections can be performed using the lens-equipped connectors 1 having the same shapes, and the costs can be reduced because there is no need for male and female connectors and metal molds can be made in common.

Figure 5:
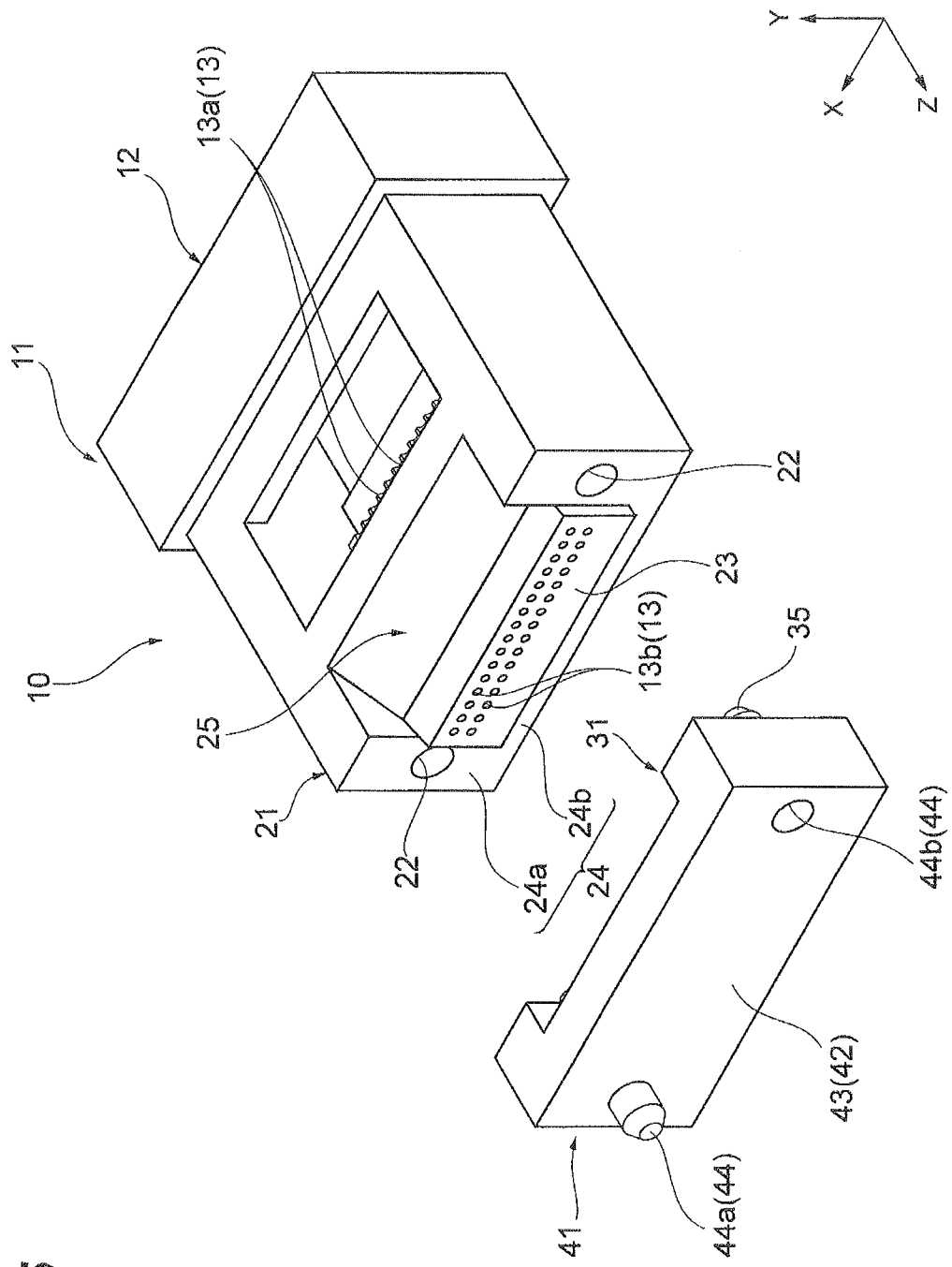
FIG. 5 is an exploded perspective view of the lens-equipped connector of FIG. 1.
Figure 6:
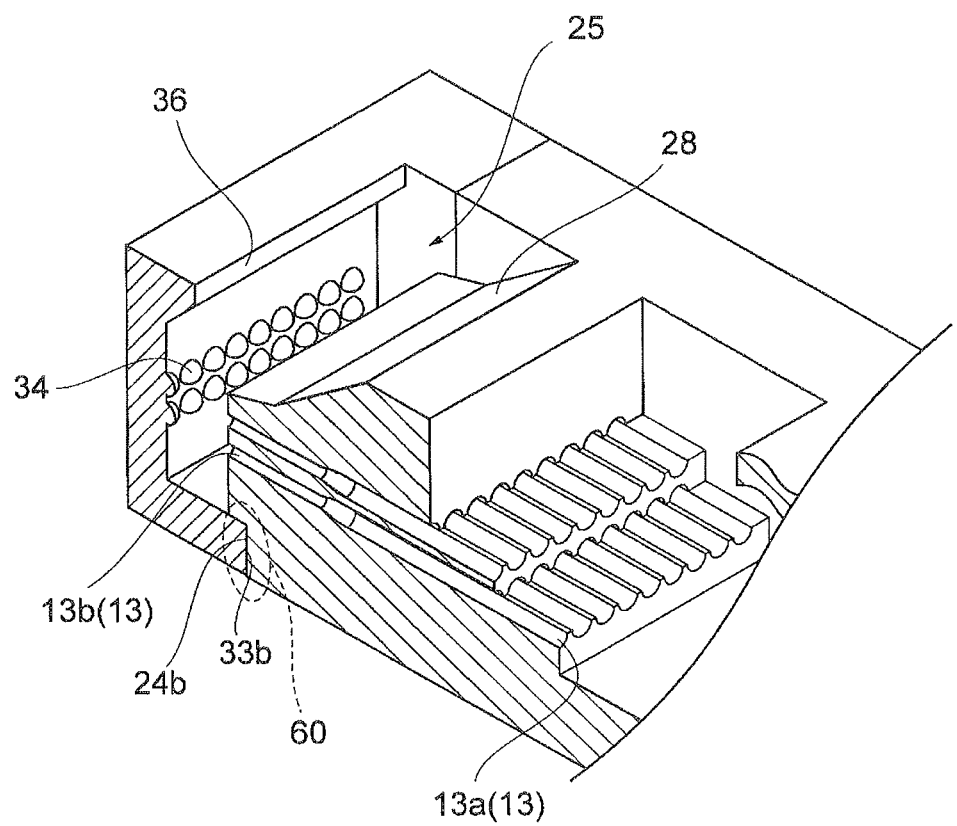
FIG. 6 is a perspective sectional view of the lens-equipped connector of FIG. 1.

Next, a connected state between the ferrule 10 and the lens array 30 will be described with reference to FIGS. 5 and 6. FIG. 5 is an exploded perspective view of the lens-equipped connector 1 of FIG. 1. FIG. 6 is a perspective sectional view of the lens-equipped connector 1 of FIG. 1. In FIGS. 5 and 6, the optical fibers F are not illustrated.

In a state in which the ferrule 10 and the lens array 30 are opposite to each other, positions of the first connection parts 22 of the ferrule 10 and positions of the second connection parts 35 of the lens array 30 match each other in the X and Y directions. The second connection parts 35 are inserted into the first connection parts 22, and thereby the abutting face 24 of the ferrule 10 and the abutting face 33 of the lens array 30 come in contact with each other. To be more specific, the first connection faces 24a provided at the opposite sides of the ferrule 10 in the X direction and the second connection faces 33a provided at the opposite sides of the lens array 30 in the X direction come in contact with each other. The first lower end face 24b provided at the lower end of the ferrule 10 in the Y direction and the second lower end face 33b provided at the lower end of the lens array 30 in the Y direction come in contact with each other, and a lower end abutting face 60 is formed.

Such a lower end abutting face 60 is formed in such a manner that the second lower end face 33b, which protrudes toward the front end 21 of the ferrule 10 relative to the incident plane 32 for which the lenses 34 are provided, and the first lower end face 24b, which is formed at the front end 21 of the ferrule 10 to be recessed (to form a level difference) toward the rear end 11 of the ferrule 10 relative to the fiber holding face 23 in which the fiber holding holes 13 are formed to house the second lower end face 33b, come in contact with each other. In this way, since the lower end abutting face 60 is formed at a place recessed toward the rear end 11 of the ferrule 10 relative to the fiber holding face 23, this can provide a structure in which, when the adhesive 50 is introduced from the open part 25, the adhesive 50 hardly leaks out.

As illustrated in FIG. 6, a retreat part 28 that is a surface formed obliquely upward from the front end 21 toward the rear end 11 is formed above the small diameter parts 13b of the fiber holding holes 13. As the retreat part 28 is formed, an interval between the open part 25 and the front end 21 of the ferrule 10 can be increased, and the adhesive 50 can be easily introduced even in a structure in which the rib 36 protruding from the upper end of the incident plane 32 toward the front end 21 of the ferrule 10 is provided.

According to the configuration described above, the lenses 34 are disposed on the rear face 31 of the lens array 30 connected with the ferrule 10. Thereby, the surface 41 of the lens array 30 can be configured with no lenses disposed thereon, and can be used as the flat face 43. The end face of the lens-equipped connector 1 can be easily cleaned. Since the first connection parts 22 formed at the front end 21 of the ferrule 10 and the second connection parts 35 formed on the rear face 31 of the lens array 30 can be connected, the lens-equipped connector 1 can be easily formed. Further, since the surface 41 of the lens array 30 is provided with the third connection parts 44 connected to the opposite connector, the connection with the counterpart connector can also be easily performed. Accordingly, it is possible to easily provide the lens-equipped connector 1 having the rear face lenses configured such that the end face can be easily cleaned.

The rear face 31 and the front end 21 have the abutting faces 33 and 24 that come in contact with each other to determine the separation distance between the lenses 34 and the front end 21. The open part 25 for introducing the adhesive 50 fixing the ferrule 10 and the lens array 30 between the rear face 31 and the front end 21 is formed between the rear face 31 and the front end 21. The rear face 31 of the lens array 30 and the front end 21 of the ferrule 10 come in contact with each other, and thereby the separation distance between the lenses 34 provided for the rear face 31 and the front end 21 is determined as a fixed distance. In the state in which the rear face 31 and the front end 21 come in contact with each other, the open part 25 is formed between the rear face 31 and the front end 21. The adhesive 50 is introduced into the open part 25, and thereby the ferrule 10 and the lens array 30 can be easily fixed while maintaining the separation distance.

The abutting faces 33 and 24 are formed to surround three of the surrounding four directions in which the lenses 34 are surrounded. Since the abutting faces 33 and 24 are formed to surround the lenses 34, the adhesive 50 introduced from the open part 25 is suitably contained, and can be prevented from leaking out.

The first lower end face 24b recessed toward the rear end 11 relative to the fiber holding face 23 is formed at the front end 21 of the ferrule 10, and the second lower end face 33b protruding toward the front end 21 relative to the incident plane 32 is formed on the rear face 31 of the lens array 30. The lower end abutting face 60 is formed by the first and second lower end faces 24b and 33b. One of the first and second lower end faces 24b and 33b is the protruding surface, and the other of the first and second lower end faces 24b and 33b is the recessed surface. Since the first and second lower end faces 24b and 33b come in contact with each other and the lower end abutting face 60 is formed, it is possible to more effectively prevent the adhesive 50 introduced from the open part 25 from leaking out, compared to, for example, a case in which faces having no unevenness come in contact with each other and an abutting face is formed. The second lower end face 33b may be configured not to protrude further than the fiber holding face 23 (not to protrude toward the rear face 31) at the front end 21 of the ferrule 10. After the optical fibers F are set for the ferrule 10 (i.e., after the optical fibers F pass through the fiber holding holes 13), when the optical fibers F are polished, the second lower end face 33b does not obstruct the polishing. Accordingly, it is possible to improve workability.

The rear face 31 of the lens array 30 further has the rib 36 protruding from the upper end of the incident plane 32 toward the open part 25. Since mechanical strength of the lens array 30 is increased by having the rib 36, the lens array 30 can be configured to endure stress caused by the volumetric change of the adhesive 50 when the adhesive 50 introduced into the open part 25 is hardened, and the lens array 30 can be prevented from being deformed.

The third connection parts 44 are formed at a pair of positions between which a region in which the light is incident and emitted with respect to the lens array 30 is sandwiched. One of the third connection parts 44 is the pin protruding from the surface 41, and the other is the hole recessed toward the rear face 31. The third connection parts 44 are formed by the pin and the hole, and thereby the connectors can be easily connected. For example, a position at which the pin is provided and a position at which the hole is provided are made in common between the connectors. Thereby, top and bottom directions of the connectors connected to each other are aligned and opposed, and the pin and the hole are opposed to each other. It is possible to prevent the connector from being reversely connected upside down.

The first connection parts 22 are the holes formed at a pair of positions between which the fiber holding holes 13 are sandwiched at the front end 21, and the second connection parts 35 are the pins formed at a pair of positions between which the lenses 34 are sandwiched. The pins (second connection parts 35) and the holes (first connection parts 22) are fitted, and thereby the ferrule 10 and the lens array 30 are connected. It is possible to facilitate a connecting task. As the ferrule 10 and the lens array 30 are connected by the pair of first connection parts 22 between which the fiber holding holes 13 are sandwiched and the pair of second connection parts 35 between which the lenses 34 are sandwiched, positions of the fiber holding holes 13 and the lenses 34 can be stably fixed, and the optical axes can be inhibited from deviating.

The ferrule 10 and the lens array 30 are formed of materials whose linear expansion coefficients are identical to each other. It is difficult for the positions of the fiber holding holes 13 and the positions of the lenses 34 to be shifted by a change in temperature, and the optical characteristics can also be hardly changed by the temperature change.

In addition, the ferrule 10 and the lens array 30 are fixed by the adhesive 50, and the adhesive covers the lenses. The refractive index of the adhesive 50 is greater than that of the air, and is less than that of the material of which the lens array 30 is formed. Thereby, it is possible to reduce a difference in refractive index between the lenses 34 and the end of the fiber, to reduce a loss caused by the beam that is subjected to Fresnel reflection by the lenses 34, and to improve the optical characteristics of the connector.

Second Embodiment

Next, a lens-equipped connector according to a second embodiment will be described. In the description of the present embodiment, differences from the above embodiment will be mainly described.

Figure 7:
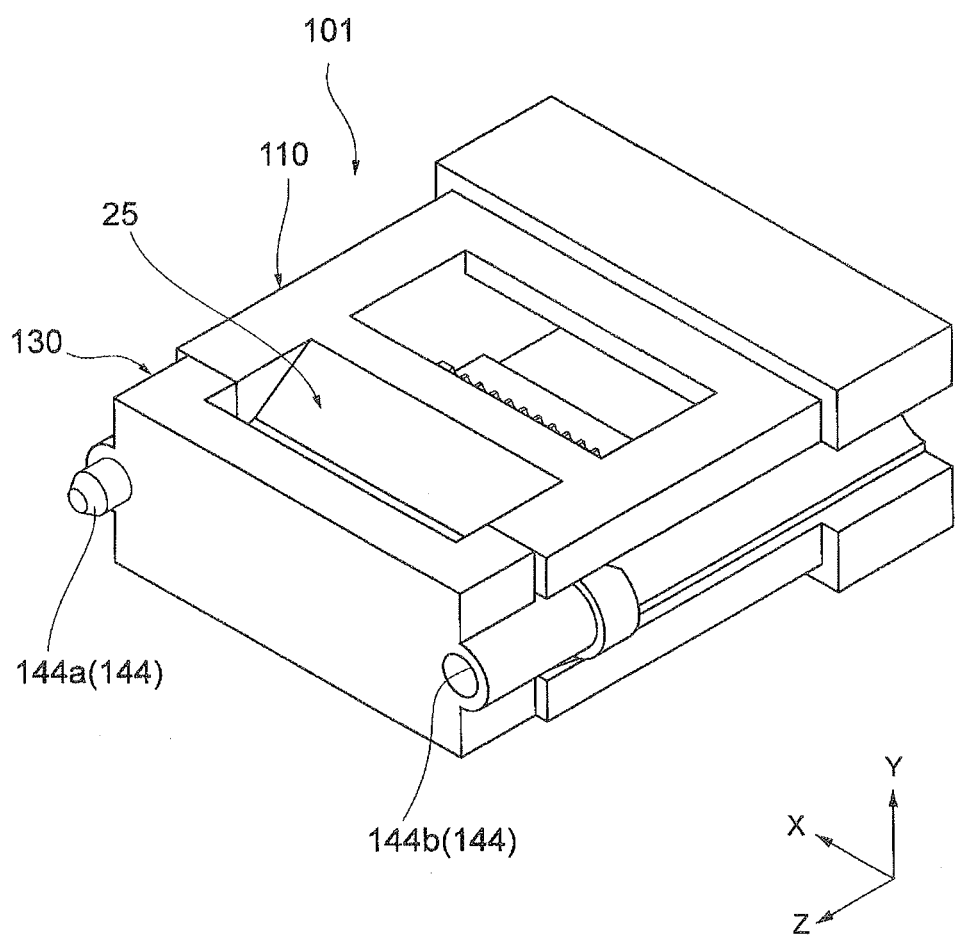
FIG. 7 is a perspective view illustrating a lens-equipped connector according to a second embodiment of the present invention.

FIG. 7 is a perspective view illustrating a lens-equipped connector 101 according to a second embodiment of the present invention. As illustrated in FIG. 7, the lens-equipped connector 101 is equipped with a ferrule 110 holding optical fibers, and a lens array 130 fixed to one end of the ferrule 110. A fundamental configuration of the lens-equipped connector 101 is identical to that of the lens-equipped connector 1 of the first embodiment. However, first connection parts provided for the ferrule 110, second connection parts provided for the lens array 130, and third connection parts provided for the lens array 130 are configured to be different from those of the lens-equipped connector 1 of the first embodiment.

Figure 8:
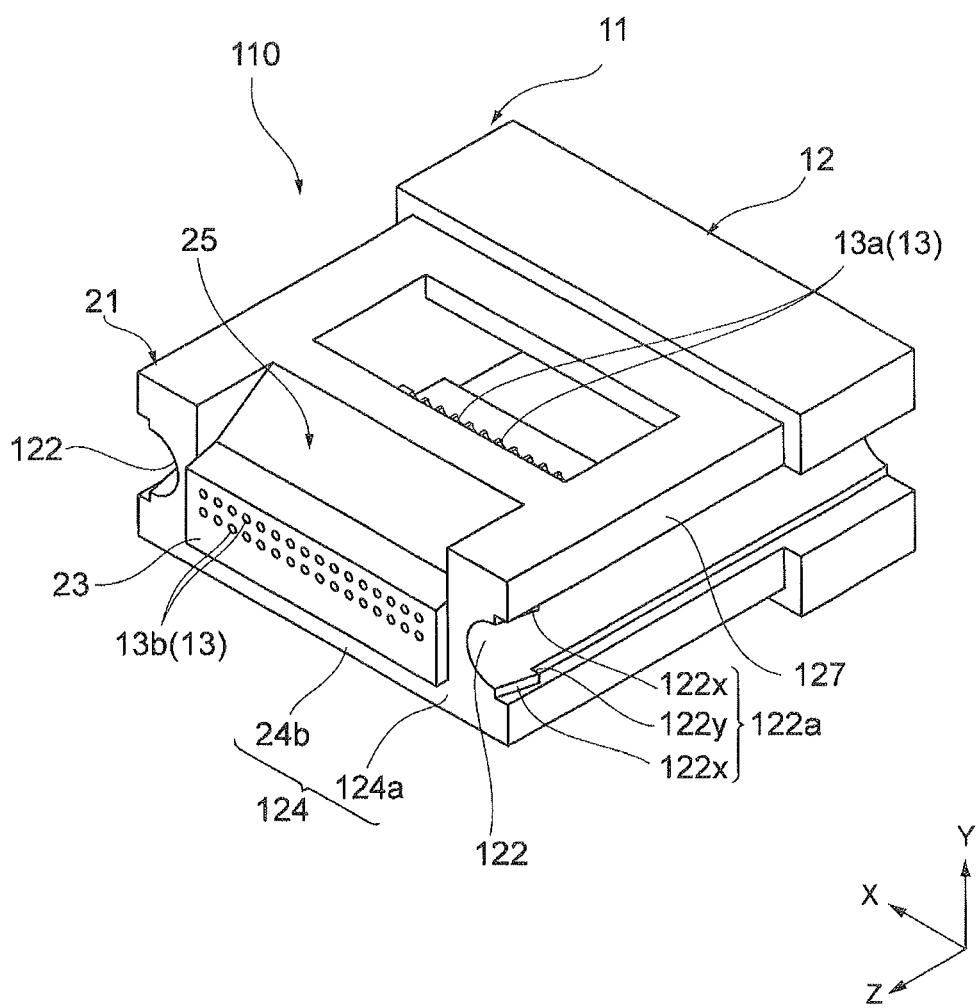
FIG. 8 is a perspective view illustrating a ferrule of the lens-equipped connector of FIG. 7.

FIG. 8 is a perspective view illustrating the ferrule 110 of the lens-equipped connector 101 of FIG. 7. A front end 21 of the ferrule 110 is provided with an abutting face 124 coming in contact with the lens array 130. The abutting face 124 is made up of first connection faces 124a provided in left and right directions (opposite sides in the X direction) of the fiber holding face 23, and a first lower end face 24b provided in a bottom direction (downward in the Y direction) of the fiber holding face 23.

First connection parts 122 to which the lens array 130 is connected are formed in the first connection faces 124a. The first connection parts 122 are identical to the first connection parts 22 of the lens-equipped connector 1 in that the guide pins (second connection parts) are configured to be inserted, but have different shapes. That is, in the ferrule 110 of the lens-equipped connector 101, opposite lateral surfaces 127 are recessed from the first connection faces 124a to a rear end 11 in a circular arc shape. In the opposite lateral surfaces 127 recessed in the circular arc shape, parts adjacent to the first connection faces 124a are the first connection parts 122. At start and end points of the circular arc (i.e., upper and lower ends of the circular arc in the Y direction), the opposite lateral surfaces 127 are recessed again, and thereby level difference parts 122a are formed.

In the first connection parts 122, the level difference parts 122a have oblique parts 122x that are inclined with respect to a Z direction to be projected from an inner side in the X direction to an outer side in the X direction with the approach to the rear end 11 from the front end 21, and ratchet parts 122y that extend in the X direction from rear ends of the oblique parts 122x (i.e., places projected to the outermost side at the oblique parts 122x in the X direction) toward the inner side in the X direction.

Figure 9A:
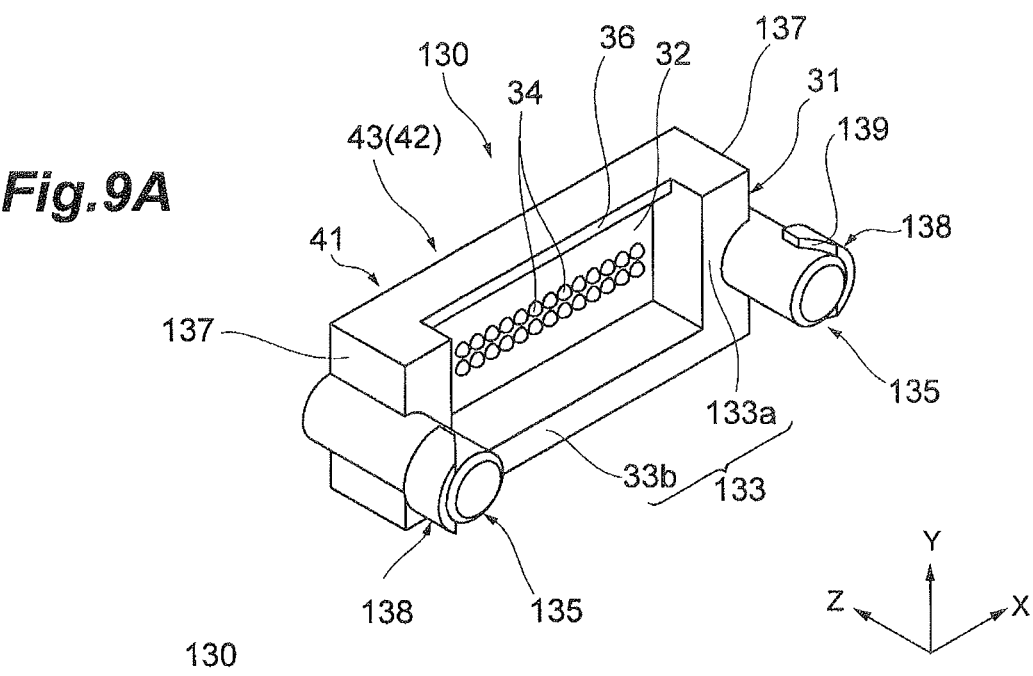
FIG. 9A is a perspective view when viewed from the front of the lens array.
Figure 9B:
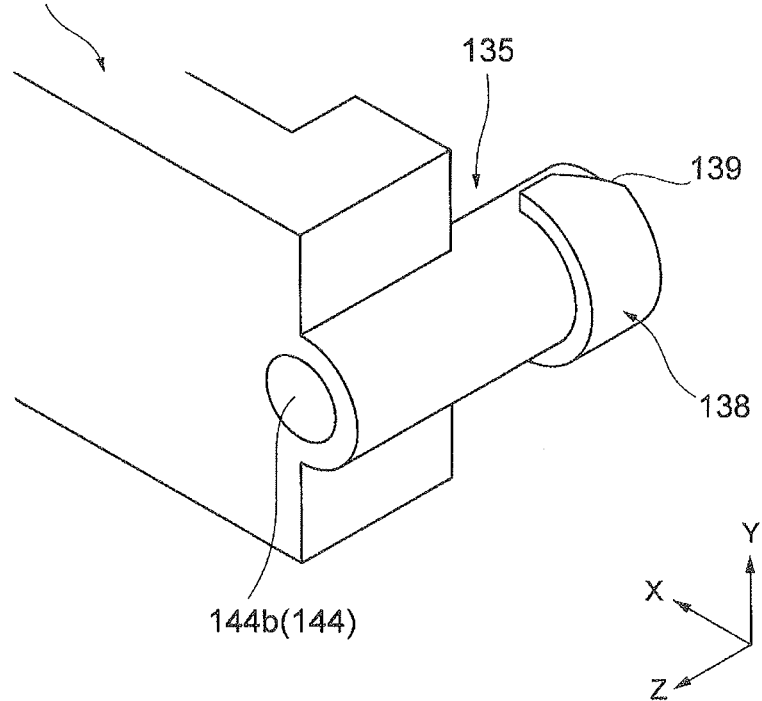
FIG. 9B is a perspective view when viewed from the rear of the lens array.

FIG. 9A is a perspective view when viewed from the front of the lens array 130, and FIG. 9B is a perspective view when viewed from the rear of the lens array 130. In the lens array 30 described in the first embodiment, the second connection parts 35 are provided to protrude from the second connection faces 33a. In contrast, in the lens array 130 of the present embodiment, second connection parts 135 are provided to follow opposite lateral surfaces 137 of the lens array 30 in the X direction. The second connection parts 135 extend from a surface 41 to a rear face 31 (more particularly, second connection faces 133a) to follow the opposite lateral surfaces 137. Further, in a state in which the second connection parts 135 are combined with the ferrule 110, the second connection parts 135 protrude from the second connection faces 133a of the abutting face 133 toward the front end 21 of the ferrule 110. The second connection parts 135 are cylindrical guide pins. Outer diameters of the guide pins partly extend from the opposite lateral surfaces 137 to the outer side (outward) in the X direction.

Tip portions of the second connection parts 135 are provided with convex parts 138 covering the tip portions.

The convex parts 138 are provided to cover nearly semi-circles of cylindrical tip portions at the opposite end sides in the X direction. Opposite end portions of the convex parts 138 in a circumferential direction have oblique parts 139 extending from the inner side in the X direction toward the outer side in the X direction with the approach to the front end 21 of the ferrule 10 from the side of the second connection faces 133a. Inclination angles of the oblique parts 139 are substantially identical to those of the aforementioned oblique parts 122x.

The surface 41 is provided with third connection parts 144 at the opposite sides in the X direction. One 144a of the third connection parts 144 (see FIG. 10) is a tapered guide pin protruding from the surface 41, and the other third connection part 144b is a hole recessed toward the rear face 31. The third connection parts 144 are provided to continue to the second connection parts 135 in the Z direction. Like the second connection parts 135, outer diameters of the third connection parts 144 partly protrude from the opposite lateral surfaces 137 to the outer side (outward) in the X direction. The outer diameters of the third connection parts 144 are equal to or slightly smaller than those of the second connection parts 135.

Figure 10:
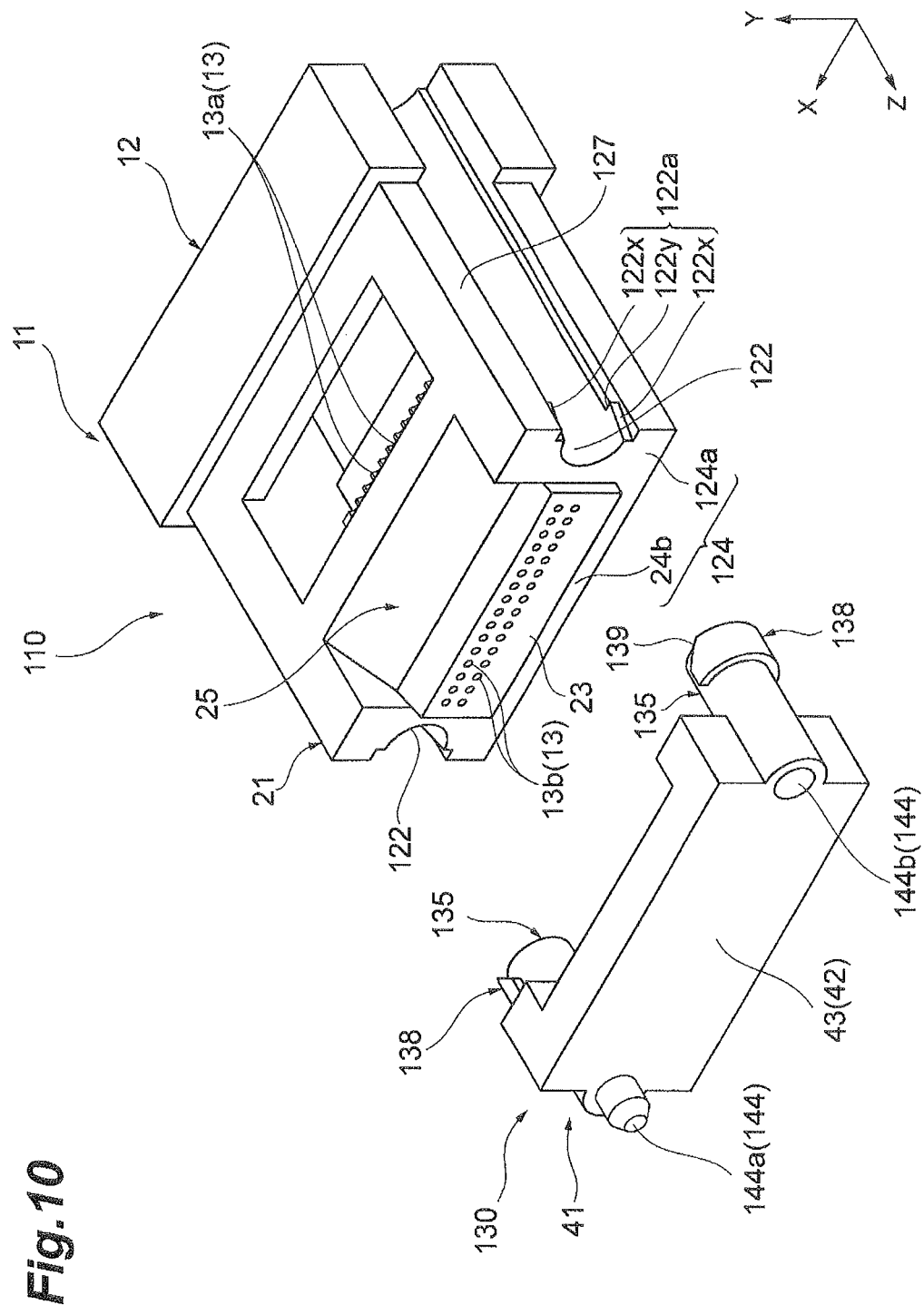
FIG. 10 is an exploded perspective view of the lens-equipped connector of FIG. 7.
Figure 11:
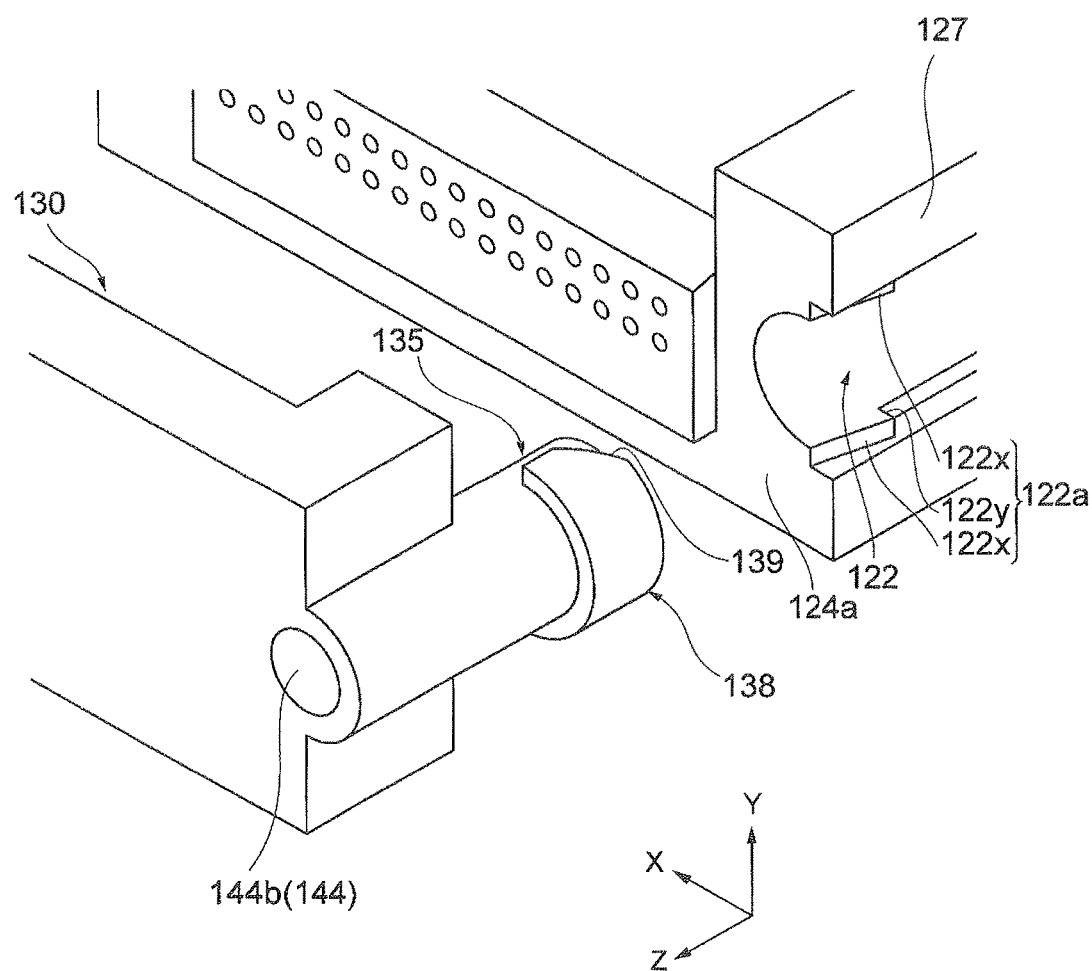
FIG. 11 is a partially enlarged view of a connection place.

Next, the connection between the ferrule 110 and the lens array 130 will be described with reference to FIGS. 10 and 11. FIG. 10 is an exploded perspective view of the lens-equipped connector 101 of FIG. 7. FIG. 11 is a partially enlarged view of a connection place. In FIGS. 10 and 11, the optical fibers F are not illustrated.

In a state in which the ferrule 110 and the lens array 130 are opposite to each other, the first connection parts 122 of the ferrule 110 and the second connection parts 135 of the lens array 130 have the same positions in the X and Y directions. The ferrule 110 and the lens array 130 are positioned by inserting the second connection parts 135 into the first connection parts 122 recessed in the circular arc shape to follow the first connection parts 122.

When the second connection parts 135 are inserted into the first connection parts 122, the lens array 130 is forcibly pushed toward the ferrule 110 in a state in which the oblique parts 122x of the first connection parts 122 and the oblique parts 139 of the second connection parts 135 are brought into contact with each other. In the forcible pushing process, along with both of the guide pins (second connection parts 135) and the holes (first connection parts 122), the shape is slightly deformed. In the deformed state, the lens array 130 is forcibly pushed further toward the ferrule 110 along inclinations of the oblique parts 122x and the oblique parts 139. Thereby, all of the convex parts 138 arrive at positions at which they climb over rear ends of the oblique parts 122x (i.e., portions projected to the outermost sides at the level difference parts 122a in the X direction) in such a manner that the oblique parts 139 arrive at the positions first and then the remaining parts behind the oblique parts 139 arrive at the positions. If the convex parts 138 are disposed at the crossed positions, the convex parts 138 and the ratchet parts 122y are fitted, and thereby the convex parts 138 (second connection parts 135) are inhibited from moving in a direction opposite to the inserting direction (pushing direction). That is, the ferrule 110 and the lens array 130 are temporarily fixed. In this way, in the state in which the ferrule 110 and the lens array 130 are temporarily fixed, the adhesive 50 is introduced from the open part 25. Thereby, the ferrule 110 and the lens array 130 can be fixed (permanently fixed) with ease, and workability is improved.

In the lens-equipped connector 101 of the second embodiment, the opposite lateral surfaces 127 of the ferrule 110 are recessed in the circular arc shape, and the first connection parts 122 are provided. The outer diameters of the second and third connection parts 135 and 144 are provided to partly protrude from the opposite lateral surfaces 137 of the lens array 130 to the outer sides in the X direction. For this reason, it is possible to reduce an area which the second connection parts 135 and the third connection parts 144 occupy with respect to the incident and outgoing planes 32 and 42 of the lens array 130. As a result, it is possible to provide more lenses 34 for the incident plane 32.

While embodiments of the present invention have been described, the present invention is not limited to the above embodiments.

For example, in the first embodiment, it is described that the first lower end face 24b recessed toward the rear end 11 relative to the fiber holding face 23 is formed at the front end 21 of the ferrule 10, the second lower end face 33b protruding toward the front end 21 relative to the incident plane 32 is formed on the rear face 31 of the lens array 30, and the lower end abutting face 60 is formed by the first and second lower end faces 24b and 33b, but the present invention is not limited thereto. That is, the first lower end face protruding toward the rear face relative to the fiber holding face may be formed, the second lower end face recessed toward the surface relative to the incident plane may be formed, and the lower end abutting face may be formed by the first and second lower end faces.

We claim:

1. A lens-equipped connector comprising a ferrule holding optical fibers and a lens array fixed to the ferrule,
   wherein the ferrule has a rear end and a front end,
   an opening that is formed in the rear end and communicates with fiber holding holes that are formed from the rear end toward the front end and hold the optical fibers, and
   first connection parts which are formed at the front end and to which the lens array is connected, and
   the lens array has
   a rear face including an incident plane that receives light from the optical fibers, and a surface including an outgoing plane from which the light from the optical fibers is emitted,
   lenses receiving the light from the optical fibers, and second connection parts connected to the first connection parts, the lenses and the second connection parts being formed on the rear face,
   a flat face from which the light from the optical fibers is emitted, and third connection parts connected to an opposite connector, the flat face and the third connection parts being formed on the surface, and wherein
   the rear face and the front end have abutting faces that come in contact with each other to determine a separation distance between the lenses and the front end; and
   an open part is formed between the rear face and the front end to introduce an adhesive fixing the ferrule and the lens array between the rear face and the front end.

2. The lens-equipped connector according to claim 1, wherein the abutting faces are formed to surround three of surrounding four directions in which the lenses are surrounded.

3. The lens-equipped connector according to claim 1, wherein:
   the abutting face of the front end includes a first lower end face that protrudes toward the rear face or is recessed toward the rear end relative to a face in which the fiber holding holes are formed at the front end;

the abutting face of the rear face includes a second lower end face that protrudes toward the front end or is recessed toward the surface relative to the incident plane for which the lenses are provided;

the first lower end face is recessed toward the rear end when the second lower end face protrudes toward the front end, and protrudes toward the rear face when the second lower end face is recessed toward the surface; and the first lower end face and the second lower end face come in contact with each other.

4. The lens-equipped connector according to claim 3, wherein the second lower end face, which protrudes toward the front end relative to the incident plane, and the first lower end face, which is formed to be recessed toward the rear end relative to the face in which the fiber holding holes are formed at the front end and to house the second lower end face, come in contact with each other.

5. The lens-equipped connector according to claim 1, wherein the lens array further has a rib that is formed on the rear face and protrudes from an upper end of the incident plane toward the open part.

6. The lens-equipped connector according to claim 1, wherein:

the third connection parts are formed at a pair of positions between which a region in which the light is incident and emitted with respect to the lens array is sandwiched; and one of the third connection parts is a pin protruding from the surface, and the other of the third connection parts is a hole recessed toward the rear face.

7. The lens-equipped connector according to claim 1, wherein:

the first connection parts are holes formed at a pair of positions between which the fiber holding holes are sandwiched at the front end; and the second connection parts are pins formed at a pair of positions between which the lenses are sandwiched.

8. The lens-equipped connector according to claim 1, wherein the first and second connection parts are formed with ratchets that are able to be mutually fitted and temporarily fixed.

9. The lens-equipped connector according to claim 1, wherein the ferrule and the lens array are formed of materials whose linear expansion coefficients are identical to each other.

10. The lens-equipped connector according to claim 1, wherein:

the ferrule and the lens array are fixed by an adhesive;

the adhesive covers the lenses; and a refractive index of the adhesive is greater than that of air and is less than that of the material of which the lens array is formed.

* * * * *